United States Patent [19]

Angott

[11] Patent Number: 4,686,380

[45] Date of Patent: Aug. 11, 1987

[54] REMOTE ON/OFF SWITCH CIRCUIT

[76] Inventor: Paul G. Angott, 457 Hurst, Troy, Mich. 48098

[21] Appl. No.: 827,363

[22] Filed: Feb. 7, 1986

[51] Int. Cl.[4] .............................................. H02B 1/24

[52] U.S. Cl. .................................. 307/125; 307/114; 307/113; 307/115; 340/825.69; 340/310 A; 340/825.72; 315/158

[58] Field of Search ............... 307/114, 115, 116, 117, 307/125, 113; 340/310 R, 310 A, 310 CP, 307, 332, 780, 696, 825.71, 825.72, 825.69, 825.06, 825.07, 825.23, 825.24, 825.29; 455/2, 4, 5, 6, 68, 77, 130, 91, 92; 315/149, 150, 154, 155, 157, 158, 159; 367/117, 135, 137, 903; 375/75, 59, 65, 66, 69

[56] References Cited

U.S. PATENT DOCUMENTS

| | | | |
|---|---|---|---|
| 3,438,037 | 4/1969 | Leland | 340/825.72 |
| 3,460,121 | 8/1969 | Wattenburg | 340/310 A X |
| 3,631,498 | 12/1971 | Bachhuber | 340/825.69 |
| 3,760,422 | 9/1973 | Zimmer et al. | 340/825.69 X |
| 4,057,805 | 11/1977 | Dowling | 340/825.72 |
| 4,355,309 | 10/1982 | Hughey et al. | 455/68 X |
| 4,538,973 | 9/1985 | Angott et al. | 340/825.69 X |
| 4,584,504 | 4/1986 | Lee et al. | 318/16 |
| 4,590,471 | 5/1986 | Pieroway et al. | 340/825.69 |
| 4,591,158 | 5/1986 | Samson et al. | 340/825.69 X |

*Primary Examiner*—William M. Shoop, Jr.
*Assistant Examiner*—Shik Luen Paul Ip
*Attorney, Agent, or Firm*—Reising, Ethington, Barnard, Perry & Milton

[57] ABSTRACT

A remotely controlled electrical power circuit (10) for supplying power to an electrical load (13) requiring electrical power from an electrical outlet comprising a receiver (14) for receiving a predetermined radio signal from a transmitter (12). The receiver (14) includes a super-generative detector (16) for receiving the predetermined radio signal. An amplifier filter (20) amplifies and filters the signal from the detector (16). A Schmitt trigger (34) detects the signal from the amplifier filter (20) and produces positive feedback to operate a latch (36), causing a detector (38) to produce a control signal in response to a first duration of the predetermined radio signal to operate relay (RY1) for closing contacts (24) and to produce a control signal in response to a second duration of the predetermined radio signal for opening the contacts (24).

17 Claims, 4 Drawing Figures

REMOTE ON/OFF SWITCH CIRCUIT

TECHNICAL FIELD

The subject invention relates to remotely controlled on/off switches and, particularly, remotely controlled on/off switches utilized with a fan drive motor and light.

BACKGROUND ART

On/off switches are extensively utilized in devices requiring full power only. This is typically accomplished by either a manual toggle switch that is manually opened and closed by the operator, or a remotely controlled circuit. In the remotely controlled circuit, a counter counts the number of pulses of a transmitted signal to toggle a relay to open or close a switch.

The operator is required to be at the location of the switch for the manual toggle switch. In the case of the remotely controlled circuit, if a signal is inappropriately transmitted, the switch will be activated. Further, the counter cannot be controlled by the operator based on the duration of the transmitted signal.

STATEMENT OF INVENTION AND ADVANTAGES

The invention includes a remotely controlled electrical power circuit for supplying power to an electrical load requiring electrical power from an electrical outlet. A radio signal receiver means electrically supplies power in response to a predetermined radio signal. The radio signal receiver means includes a super-generative detector for receiving the predetermined radio signal and switch means to close a power circuit in response to a control signal. Further, the radio signal receiver means includes amplifier filter means for amplifying the predetermined radio signal, and trigger means to produce a positive control signal in response to a first duration of the predetermined radio signal for closing the switch means and to a produce a positive control signal in response to a second duration of the predetermined radio signal for opening the switch means.

Accordingly, a device using the subject invention can be remotely controlled from any location, increasing the mobility of the operator. Also, the switch is controlled by the operator in response to the duration of the predetermined radio signal, preventing the switch from being activated by an incorrectly or inappropriately transmitted signal.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figures 1, 1A:
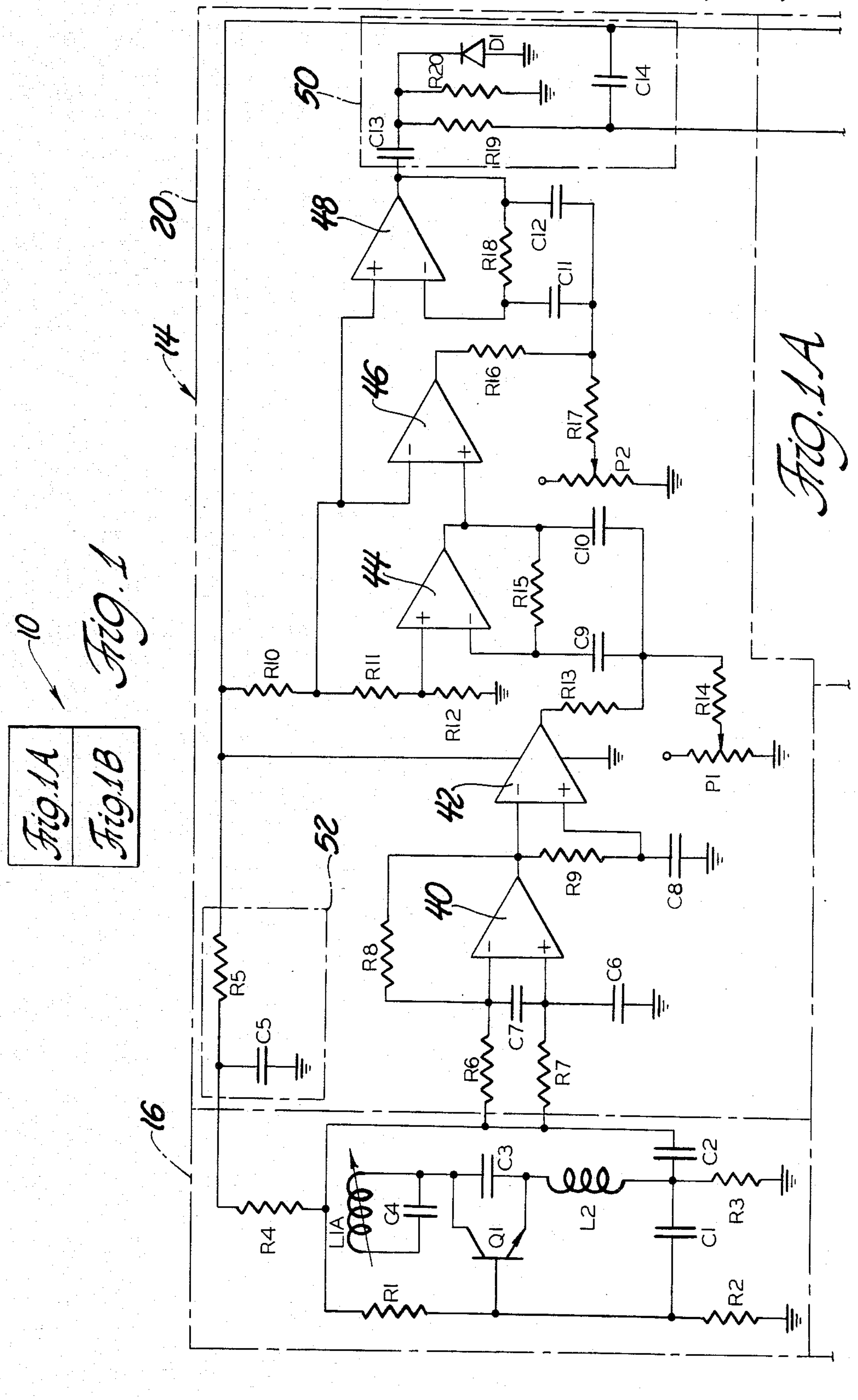
FIG. 1A is a schematic of the upper half of a peferred circuit the invention.
Figure 1B:
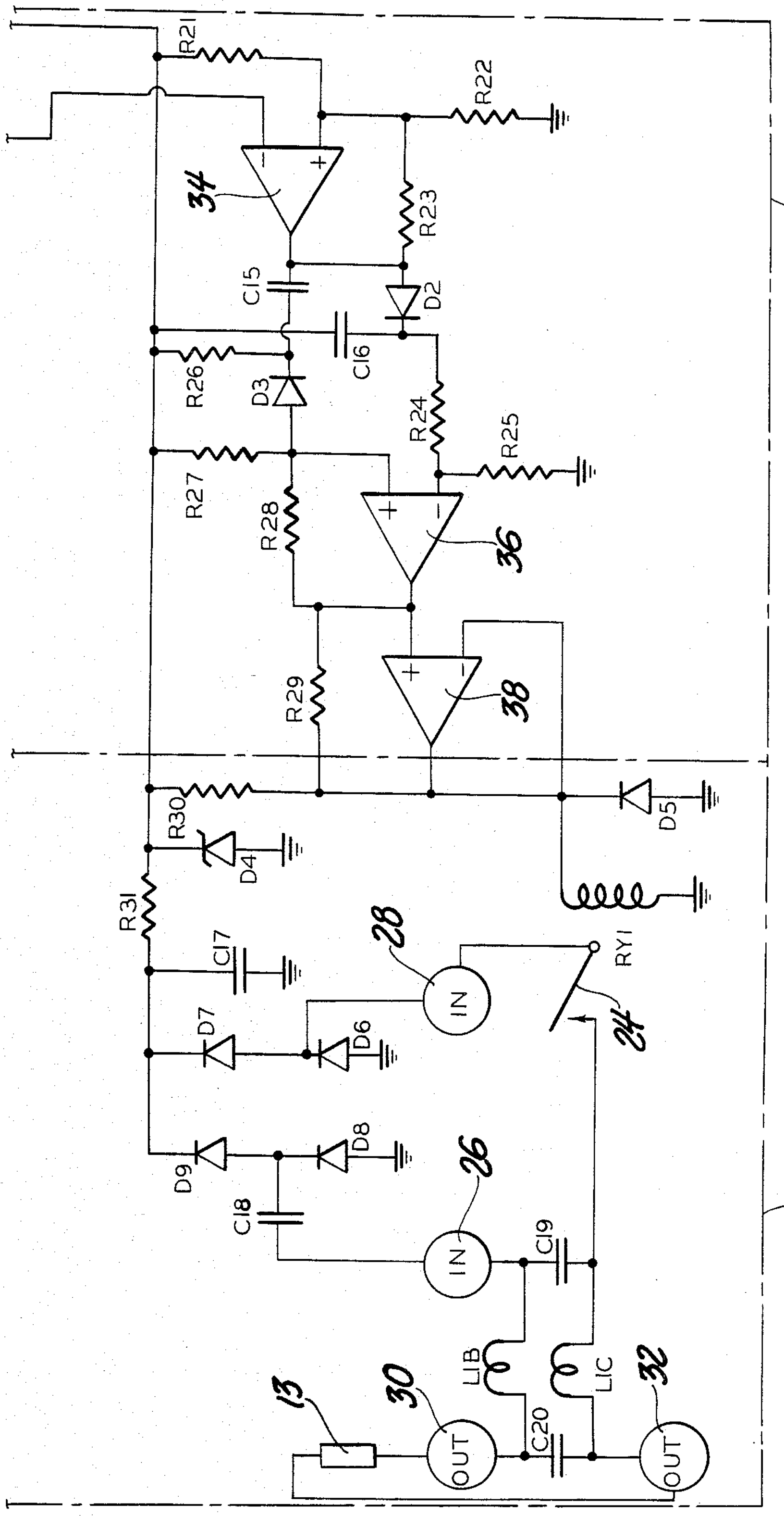
FIG. 1B is a circuit schematic of the lower half of the circuit of FIG. 1.

A remotely controlled on/off switch or electrical power assembly is generally shown at 14 and 12. The assembly 12, 14 supplies power to an electrical load 13 requiring electrical power from an electrical outlet. The assembly 12, 14 comprises radio signal receiver means, generally indicated at 14, for electrically supplying power to an electrical load 13 in response to a predetermined radio signal. In other words, the assembly 12, 14 can be used with any device requiring power from a conventional electrical outlet for electrically supplying power in response to a predetermined radio signal.

The radio signal receiver means 14 includes a super-generative detector 16 for receiving the predetermined radio signal, switch means 18 to close a contact 24 in response to a control signal, amplifier filter means 20 for amplifying the predetermined radio signal, and trigger means 22 to produce a positive control signal in response to a first duration of the predetermined radio signal for closing the switch means 18 and to produce a positive control signal in response to a second duration of the predetermined radio signal for opening the switch means 18. In other words, the trigger means 22 produces a positive control signal in response to a first duration of the predetermined radio signal.

The assembly includes transmitter means 12 for transmitting the predetermined radio signal to the receiver means 14 for remotely controlling the electrical power supply to an electrical load 13. Put another way, the assembly includes transmitting means 12 for transmitting the predetermined radio signal to the receiver means 14 for turning on/off the electrical power to an electrical device or load 13.

The trigger means 22 comprises a first threshold detector 34 and first, second, and third trigger means resistors R21, R22, R23, forming a Schmitt trigger with positive feedback for detecting the predetermined radio or frequency signal from the amplifier filter means 20 to produce a positive control signal. Thus, a first duration (typically two seconds) of the predetermined radio signal will exceed the threshold value, and the first threshold detector 34 will turn on. If a second duration of the predetermined radio signal is short (typically less than one second), the first threshold detector 34 will turn off. The trigger means 22 includes output and first duration capacitors C15, C16, second and first trigger means diodes D2, D3, fifth and sixth and fourth and seventh and eighth trigger means resistors R24, R25, R26, R27, R28, and an additional or third detector 36 forming a latch with memory capability for maintaining a set state until a reset pulse is detected, causing the threshold detector 36 to go low. In other words, the latch has memory capability so that once a predetermined radio signal of long duration (typically two seconds) is transmitted and received, the first threshold detector 34 will turn "on," causing the latch to remember this "on" state. If another predetermined radio signal of the same duration is received, the latch will maintain its prior state until a predetermined radio signal of short duration is detected, causing the threshold detector 36 to go low. The trigger means 22 further comprises a second threshold detector 38 first and feedback resistor R29 for detecting the output from the latch, for producing a control signal to operate the switch means 18.

Figure 2:
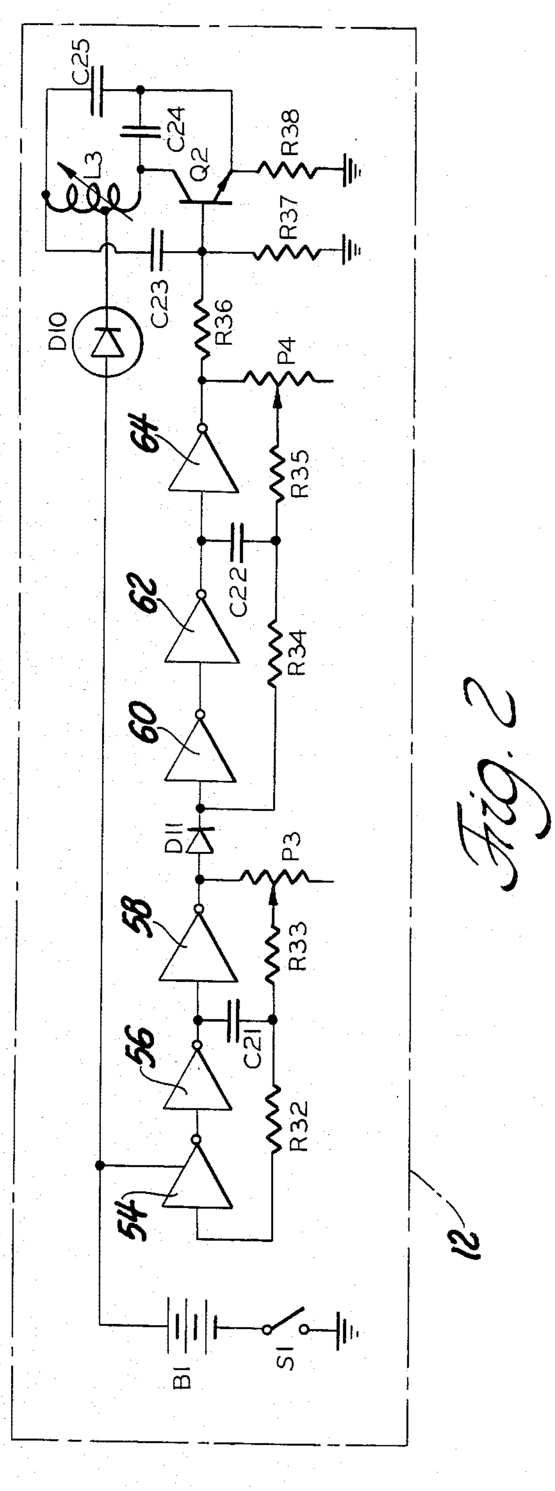
FIG. 2 is a schematic of a preferred transmitter circuit of the invention.

The receiver means 14 includes an antenna L1 which picks up the radio signals propagated by the transmitter means 12. The transmitter means 12 is illustrated in FIG. 2.

The super-generative detector 16 comprises; a first inductance L1A and a first and second coupling antenna, L1B, L1C connected to the first inductor L1A and third coupling capacitor C4 to define a tuned circuit. A super-generative transistor Q1 is connected to the tuned circuit L1A-C4 and a first feedback capacitor C3 and a second inductance L2 defining an isolation choke. A fourth coupling capacitor C2 interconnects the first inductance L1A and the second inductance L2. An emitter resistor R3 interconnects the second inductance L2 and the electrical potential, in this case ground. A second feedback capacitor C1 and a based limiting resistor R2 are placed between the first inductance L1A and the electrical potential for setting the time constant for the quench rate for the super-generative transistor Q1. A pair of biasing resistors R1 and R4 are for setting the bias on the super-regenerative transistor Q1.

The switch means 18 comprises contact 24 and a relay RY1 controlled by the trigger means 22 for operating the contact 24. In other words, the control signal from the second threshold detector 38 charges the relay RY1 to close the contact 24 for supplying power to an electrical load 13. Power-in connectors 26, 28 supply power to the receiver means 14 from an electrical outlet. The switch means 18 further comprises first blocking diodes D8, D6 interconnecting power-in connectors 26, 28 and the ground potential to prevent current from flowing to the ground potential. Power-out connectors 30, 32 interconnecting the electrical load 13 and the power-in connectors 26, 28 supply power to an electrical load 13 once the power circuit 24 is closed. A pair of blocking capacitors C19, C20 interconnecting power-in connectors 26, 28 and power-out connectors 30, 32 prevent shorting of the electrical potentials, respectively. A second pair of blocking diodes D9, D7 interconnecting power-in connectors 26, 28 and relay RY1 prevent current from leaking back to power-in connectors 26, 28. A first limiting capacitor C18 interconnects one of the second pair of blocking diodes D9 and power-in connector 26 for limiting the current to the receiver means 14 from the power-in connector 26. A zener diode D4 and associated resistor R30 are interconnected between the relay RY1 and the second pair of blocking diodes D9, D7 for limiting the current flow to the relay RY1. A additional capacitor C17 and additional resistor R31 are interconnected between the zener diode D4 and the second pair of blocking diodes D9, D7 to limit the potential to the relay RY1. A freewheeling diode D5 is in parallel with the relay RY1 and connected to the ground potential for preventing current from flowing to the electrical ground potential.

The amplifier filter means 20 comprises an amplifier filter 40 connected to super-generative detector 16 for amplifying the predetermined signal and filtering out unwanted noise. A limiter 42 limits the amplitude of the signal from the amplifier filter 40. A high bandpass filter 44 tunes the frequency of the signal from the limiter 42 by leaving the gain and band width of the signal constant. A fourth threshold detector 46 limits the signal at full amplitude from the high band pass filter 44. A narrow band filter 48 filters out unwanted frequencies outside of the predetermined frequency of the fourth threshold signal from the detector 46. A fifth detector 50 detects the signal from the narrow band filter 48 for limiting the signal at full amplitude. A power suppy filter 52 filters out potential surges in the power supply.

The amplifier filter 40 comprises a first op-amp 40, first and second filter capacitor C7, C6, and first and second and third voltage divider resistors R6, R7, R8 for establishing a given closed loop gain. The limiter 42 connected to the amplifier filter 40 comprises second op-amp 42, second limiting capacitor C8, and first limiting resistor R9. The high bandpass filter 44 connected to the limiter 42 comprises a third op-amp 44, second pair of blocking capacitors C9, C10, a series of six resistors R10, R11, R12, R13, R14, R15, and a first trim or tuning resistor P1 for tuning the frequency of the signal from the limiter 42. The fourth threshold detector 46 connected to the high bandpass filter 44 comprises a fourth op-amp 46 for limiting the signal at full amplitude from the third op-amp 44. The threshold narrow band filter 48 connected to the fourth detector 46 comprises a fifth op-amp 48, third pair of blocking capacitors C11, C12, fourth and fifth voltage divider resistors and a second feedback resistor R16, R17, R18, and a second tuning resistor P2 defining a tuned circuit for filtering out unwanted frequencies outside the predetermined frequency. The fifth detector 50 first and second coupling comprises capacitors C13, C14 as filters, receiver means diode D1, and sixth and seventh voltage divider resistors R19, R20 for limiting the amplitude of the signal. The power supply filter 52 comprises a resistor R5 and a capacitor C5.

A transmitter means 12, as shown in FIG. 2, is included and comprises a switch S1 for supplying power from a power supply or source B1 through a an eleventh transmitter means diode D11 to a radio frequency oscillator and to a first inverted network 54, 56, 58 combined with first and second transmitter means resistors R32, R33, first transmitter means capacitor C21, and a third variable resistor P3 to define a first audio frequency square wave oscillator. An LED D10 is illuminated by power through the power supply B1 where the switch S1 is depressed to indicate that a signal is being transmitted. The square wave from the first audio frequency square wave oscillator is applied to a second inverted network 60, 62, 64 combined with third and fourth transmitter means resistors R34, R35, second transmitter means capacitor C22, and a fourth variable resistor P4 to define a second audio frequency square wave oscillator when the square wave of the first oscillator is low. The square wave is supplied to a square wave oscillator transistor Q2, the bias of which is controlled by the fifth transmitting means biasing resistor R36 and combined with a third transmitter means capacitor C24. An inductance-capacitor network L3-C25 acts as a tuned circuit for the oscillator. Also included are fifth coupling capacitor C23, and sixth transmitter means resistor R38 interconnecting the oscillator transistor Q2 and an electrical potential, and a fifth coupling resistor R37 between twenty-third capacitor C23 and the electrical potential for setting the time constant for the quench rate for the transistor Q2.

By way of example, and certainly not by way of limitation, the preferred embodiments of the circuits illustrated may include the following components.

CAPACITORS

| Capacitor | Value (farad) | Voltage |
|---|---|---|
| C1 | 1 nano | 50 |
| C2 | 100 pico | 50 |
| C3 | 5 pico | 50 |
| C4 | 2 pico | 50 |
| C5 | 100 micro | 16 |
| C6 | 10 micro | 16 |
| C7 | 100 pico | 50 |
| C8 | 10 micro | 16 |

-continued

| | | |
|---|---|---|
| C9 | 1 nano | 50 |
| C10 | 1 nano | 50 |
| C11 | 22 nano | 50 |
| C12 | 22 nano | 50 |
| C13 | 10 micro | 16 |
| C14 | 1 micro | 16 |
| C15 | 1 micro | 16 |
| C16 | 3.3 micro | 16 |
| C17 | 100 micro | 25 |
| C18 | 1.5 micro | 250 |
| C19 | 100 pico | 500 |
| C20 | 100 pico | 500 |
| C21 | 22 nano | 50 |
| C22 | 1 nano | 50 |
| C23 | 2 pico | 50 |
| C24 | 7 pico | 50 |
| C25 | 7 pico | 50 |

DIODES

| Diodes | Value |
|---|---|
| D1 | IN 4148 |
| D2 | IN 4148 |
| D3 | IN 4148 |
| D4 | IN 4743A |
| D5 | IN 4004 |
| D6 | IN 4004 |
| D7 | IN 4004 |
| D8 | IN 4004 |
| D9 | IN 4004 |
| D10 | IN LED |
| D11 | IN 4148 |

INDUCTORS

| Inductors | Value |
|---|---|
| L1A | 2 loops |
| L1B | 1 loop |
| L1C | 1 loop |
| L2 | 1 microhenry |
| L3 | 2 loops |

TRIM POTS

| Trim Pots | Value |
|---|---|
| P1 | 10 K horizontal |
| P2 | 20 K horizontal |
| P3 | 500 K horizontal |
| P4 | 1 M horizontal |

TRANSISTORS

| Transistors | Value |
|---|---|
| 01 | 9018 F |
| 02 | 9018 F |

RESISTORS

| Resistors | Value |
|---|---|
| R1 | 10 K |
| R2 | 3.3 K |
| R3 | 470 ohm |
| R4 | 10 K |
| R5 | 4.7 K |
| R6 | 4.7 K |
| R7 | 4.7 K |
| R8 | 1 M |
| R9 | 4.7 K |
| R10 | 47 K |
| R11 | 10 K |
| R12 | 47 K |
| R13 | 3.3 M |
| R14 | 12 K |
| R15 | 4.7 M |
| R16 | 330 K |
| R17 | 4.7 K |
| R18 | 1.8 M |
| R19 | 100 K |
| R20 | 10 K |
| R21 | 330 K |
| R22 | 47 K |
| R23 | 1 M |
| R24 | 330 K |
| R25 | 1 M |
| R26 | 330 K |
| R27 | 330 K |

-continued

| | |
|---|---|
| R28 | 330 K |
| R29 | 2.2 ohm |
| R30 | 560 ohm |
| R31 | 100 ohm |
| R32 | 1 M |
| R33 | 220 K |
| R34 | 2.2 M |
| R35 | 430 K |
| R36 | 22 K |
| R37 | 10 K |
| R38 | 1 K |

RELAY

| Relay | Value |
|---|---|
| RY1 | Original SRU-UH-SS-112DM |

I.C.'S

| I.C.'s | Value |
|---|---|
| U1 | LM 324 |
| U2 | LM 324 |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A remotely controlled electrical power assembly including a circuit (14) for supplying power to an electrical load (13) requiring electrical power from an electrical outlet, said circuit comprising; radio signal receiver means (14) for electrically supplying power in response to a predetermined radio signal, and including a super-generative detector (16) for receiving said predetermined radio signal, switch means (18) to close a power circuit (24) in response to a control signal for supplying power to said load (13), amplifier filter means (20) for amplifying and filtering said predetermined radio signal, and trigger means (22) to produce a positive control signal in response to a first duration of said predetermined radio signal for closing said switch means (18) and to produce a positive control signal in response to a second duration of said predetermined radio signal for opening said switch means (18), said switch means (18) being closed in response to said first duration supplying power to said load (13) until said second duration is received to open said switch means (18) and being open until said first duration is received to close said switch means (18).

2. A circuit as set forth in claim 1 wherein said trigger means (22) comprises; a first threshold detector (34) and first, second and third trigger means resistors (R21, R22, R23) forming a Schmitt trigger with positive feedback for detecting a predetermined frequency signal from said amplifier filter means (20) to produce a positive control signal, output and first duration capacitors (C15, C16) and first and second trigger means diodes (D3, D2) and an additional threshold detector (36) receiving said control signal from said first threshold detector (34) and forming a latch with memory capability for maintaining a set state until a rest pulse is detected causing said additional threshold detector (36) to go low.

3. A circuit as set forth in claim 1 wherein said trigger means (22) further includes a second threshold detector (38) first and feedback resistor (R29) for detecting output from said latch and producing a control signal to operate said switch means (18).

4. A circuit as set forth in claim 3 wherein said switch means (18) comprises; a contact (24), a relay (RY1) controlled by said trigger means (22) for operating said contact (24), power-in connectors (26, 28) for supplying power to said receiver means (14) from an electrical source, a first pair of blocking diodes (D8, D6) interconnecting said power-in connectors (26, 28) and the ground potential to prevent current from flowing to the ground potential, power-out connectors (30, 32) supplying power to an electrical load (13) once said contact (24) is closed, a first pair of blocking capacitors (C19, C20) interconnecting said power-in connectors (26, 28) and said power-out connectors (30, 32) and preventing shorting of the electrical potentials, respectively, a second pair of blocking diodes (D9, D7) interconnecting said power-in connectors (26, 28) and said relay (R41) and preventing current from leaking back to said power-in connectors (26, 28) a first limiting capacitor (C18) interconnecting one of said second pair of blocking diodes (D9) and said power-in connector (26) for limiting the current to said receiver means (14) from said power-in connector (26), a zener diode (D4) and associated resistor (R30) interconnecting said relay (RY1) and said second pair of blocking diodes (D9, D7) for limiting the current flow to said relay (RY1), an additional capacitor (C17) and an additional resistor (R31) interconnecting said zener diode (D4) and said second pair of blocking diodes (D9, D7) to limit the potential to said relay (RY1), and a free-wheeling diode (D5) in parallel with said relay (RY1) preventing current from flowing to the electrical potential.

5. A circuit as set forth in claim 4 wherein said amplifier filter means (20) comprises; amplifier filter (40) connected to said super-generative detector (16) amplifying said predetermined signal and filtering out unwanted noise, limiter (42) limiting the amplitude of said signal from said amplifier filter (40), high bandpass filter (44) tuning the frequency of said signal from said limiter (42) leaving the gain and band width of said signal constant, a fourth threshold detector (46) limiting said signal from said filter (44) at full amplitude, narrow band filter (48) filtering out unwanted frequencies outside of said predetermined frequency of said signal from said fourth threshold detector (46), and a fifth detector (50) detecting said signal from said narrow band filter (48) limiting said signal at full amplitude.

6. A circuit as set forth in claim 5 including power supply filter (52) for filtering out potential surges in the power supply.

7. A circuit as set forth in claim 6 wherein said amplifier filter (40) comprises; a first op-amp (40), a first and second filter capacitor (C7, C6), and a first and second and third voltage divider resistor (R6, R7, R8) for establishing a given closed loop gain.

8. A circuit as set forth in claim 7 wherein said limiter (42) comprises; second op-amp (42), second limiting capacitor (C8), and first limiting resistor (R9).

9. A circuit as set forth in claim 8 wherein said high bandpass filter (44) comprises; a third op-amp (44), second pair of blocking capacitors (C9, C10), a series of six resistors (R10, R11, R12, R13, R14, R15), and first tuning resistor (P1) tuning the frequency of said signal from said limited (42).

10. A circuit as set forth in claim 9 wherein said fourth threshold detector (46) comprises; fourth op-amp (46) for limiting the signal at full amplitude from said filter (44).

11. A circuit as set forth in claim 10 wherein said narrow band filter (48) comprises; fifth op-amp (48), third pair of blocking capacitors (C11, C12), fourth and fifth voltage divider and second feedback resistors (R16, R17, R18), and a second tuning resistor (P2) defining a tuned circuit for filtering out unwanted frequencies outside said predetermined frequency.

12. A circuit as set forth in claim 11 wherein said fifth detector (50) comprises; first and second coupling capacitors (C13, C14) as filters, a receiver means diode (D1), and sixth and seventh voltage divider resistors (R19, R20) for limiting the amplitude of said signal.

13. A circuit as set forth in claim 12 wherein said super-generative detector (16) comprises; first inductance (L1A) and a first and second coupling antenna (L1B, L1C) and a third coupling capacitor (C4) connected to said first inductance (L1A) defining a tuned circuit, a super-generative transistor (Q1) connected to said tuned circuit (L1A-C4) and a first feedback capacitor (C3) and a second inductance (L2) defining an isolation choke, a fourth coupling capacitor (C2) interconnecting said first inductance (L1A) and said second inductance (L2), an emitter resistor (R3) interconnecting said second inductance (L2) and an electrical potential, a second feedback capacitor (C1) and a base limiting resistor (R2) interconnecting said first inductance (L1A) and the electrical potential for setting the time constant for the quench rate for said super-generative transistor (Q1), and a pair of biasing resistors (R1, R4) setting the bias on said super-generative transistor (Q1).

14. A circuit as set forth in claim 13 including transmitter means (12) for transmitting said predetermined radio signal to said receiver means (14) for remotely controlling the electrical power supply to an electrical load (13).

15. A remotely controlled electrical power assembly as set forth in claim 14 wherein said transmitter means (12) comprises; a switch (S1) supplying power from a power supply (B1) through a transmitter means diode (D11) to a radio frequency oscillator and to a first inverted network (54, 56, 58) combined with first and second transmitter means resistors (R32, R33), first transmitter means capacitor (C21), and a third variable resistor (P3) to define a first audio frequency square wave oscillator, the square wave of which is applied to a second inverted network (60, 62, 64) combined with third and fourth transmitter means resistors (R34, R35), a second transmitter means capacitor (C22) and fourth variable resistor (P4) to define a second audio frequency square wave oscillator when the square wave of the first oscillator is low, supplying square wave current to a square wave oscillator transistor (Q2) the bias of which is controlled by a fifth transmitting means resistor (R36) and combined with a third feedback capacitor (C24), an inductance-capacitor network (L3-C25) acting as a tuned circuit for the oscillator and including a fifth coupling capacitor (C23), a sixth transmitting means resistor (R38) interconnecting said oscillator transistor (Q2) and an electrical potential, and a seventh transmitting means resistor (R37) between said fifth coupling capacitor (C23) and the electrical potential for setting the time constat for the quench rate for said oscillator transistor (Q2).

16. A remotely controlled electrical power assembly including a circuit (14) for supplying power to an electrical load (13) requiring electrical power from an electrical outlet, said circuit comprising; radio signal receiver means (14) for electrically supplying power in response to a predetermined radio signal, and including a super-generative detector (16) for receiving said predetermined radio signal, switch means (18) to close a power circuit (24) in response to a control signal, amplifier filter means (20) for amplifying said predetermined radio signal, trigger means (22) to produce a positive control signal in response to a first duration of said predetermined radio signal for closing said switch means (18) and to produce a positive control signal in response to a second duration of said predetermined radio signal for opening said switch means (18), said trigger means (22) including a first threshold detector (34) and first and second and third trigger means resistors (R21, R22, R23) forming a Schmitt trigger with positive feedback for detecting a predetermined frequency signal from said amplifier filter means (20) to produce a positive control signal, an output capacitor (C15) connected to the output of said first threshold detector (34) and a fourth trigger means resistor (R26) and first trigger mans diode (D3) connected to said output capacitor (C15) for holding for said first duration, a second trigger means diode (D2) connected to the output of said first threshold detector (34) and a first duration capacitor (C16) connected to said second trigger mans diode (D2) and fifth and sixth trigger means resistors (R24, R25) in series connected to said second trigger means diode (D2) for holding for said second duration, and an additional threshold detector (36) for receiving the delayed signal from said first detector (34) and forming a latch memory capability for maintaining a set state until a rest pulse is detected causing said additional detector (36) to go low.

17. A remotely controlled electrical power assembly including a circuit (14) for supplying power to an electrical load (13) requiring electrical power from an electrical outlet, said circuit comprising; radio signal receiver means (14) for electrically supplying power in response to a predetermined radio signal, and including a super-generative detector (16) for receiving said predetermined radio signal, switch means (18) to close a power circuit (24) in response to a control signal, amplifier filter means (20) for amplifying said predetermined radio signal, trigger means (22) to produce a positive control signal in response to a first duration of said predetermined radio signal for closing said switch means (18) and to produce a positive control signal in response to a second duration of said predetermined radio signal for opening said switch means (18), said switch means (18) comprising a contact (24), a relay (RY1) controlled by said trigger means (22) for operating said contact (24), power-in connectors (26, 28) for supplying power to said receiver means (14) from an electrical source, a first pair of blocking diodes (D8, D6) interconnecting said power-in connectors (26, 28) and the ground potential to prevent current from flowing to the ground potential, power-out connectors (30, 32) supplying power to an electrical load (13) once the contact (24) is closed, a pair of blocking capacitors (C19, C20) interconnecting said power-in connectors (26, 28) and said power-out connectors (30, 32) and preventing shorting of the electrical potentials, respectively, a second pair of blocking diodes (D9, D7) interconnecting said power-in connectors (26, 28) a first limiting capacitor (C18) interconnecting one of said second pair of blocking diodes (D9) and said power-in connector (26) for limiting the current to said receiver means (14) from said power-in connector (26), a zener diode (D4) and associated resistor (R30) interconnecting said relay (RY1) and said second pair of blocking diodes (D9, D7) for limiting the current flow to said relay (RY1), an additional capacitor (C17) and an additional resistor (R31) interconnecting said zener diode (D4) and said second pair of blocking diodes (D9, D7) for limiting the potential to said relay (RY1), and a free-wheeling diode (D5) in parallel with said relay (RY1) for preventing current from flowing to the electrical potential.

* * * * *